: US007035923B1

(12) United States Patent
Yoakum et al.

(10) Patent No.: US 7,035,923 B1
(45) Date of Patent: *Apr. 25, 2006

(54) PRESENCE INFORMATION SPECIFYING COMMUNICATION PREFERENCES

(75) Inventors: John H. Yoakum, Cary, NC (US); Steve J. McKinnon, Cary, NC (US); Samuel H. Christie, IV, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 759 days.

This patent is subject to a terminal disclaimer.

(21) Appl. No.: 10/119,783

(22) Filed: Apr. 10, 2002

(51) Int. Cl.
G06F 15/173 (2006.01)

(52) U.S. Cl. .................. 709/224; 709/203; 709/217; 379/93.01; 379/106.01

(58) Field of Classification Search ................ 709/224, 709/223, 226, 217–219, 203; 379/93.01, 379/106.01
See application file for complete search history.

(56) References Cited

U.S. PATENT DOCUMENTS

| | | | |
|---|---|---|---|
| 4,932,050 A | 6/1990 | Davidson et al. ........... 379/211 |
| 5,185,782 A | 2/1993 | Srinivasan ................... 379/67 |
| 5,243,645 A | 9/1993 | Bissell et al. ................ 379/211 |
| 5,315,636 A | 5/1994 | Patel .......................... 379/58 |
| 5,414,759 A | 5/1995 | Ishikuri et al. ............... 379/88 |
| 5,450,613 A | 9/1995 | Takahara et al. ........... 455/54.1 |
| 5,550,907 A | 8/1996 | Carlsen ....................... 379/207 |
| 5,555,376 A | 9/1996 | Theimer et al. ....... 395/200.09 |
| 5,596,633 A | 1/1997 | Meier et al. ................. 379/201 |
| 5,633,921 A | 5/1997 | Soderberg ................... 379/207 |
| 5,633,924 A | 5/1997 | Kaish et al. ................. 379/266 |
| 5,742,905 A * | 4/1998 | Pepe et al. ................... 455/461 |
| 5,757,901 A | 5/1998 | Hiroshige .................... 379/212 |
| 5,771,280 A | 6/1998 | Johnson ..................... 379/93.23 |
| 5,790,649 A | 8/1998 | Hiroshige .................... 379/201 |
| 5,812,865 A | 9/1998 | Theimer et al. ............. 395/800 |
| 5,815,554 A | 9/1998 | Burgess et al. ........... 379/90.01 |
| 5,825,864 A | 10/1998 | McGraw et al. ............. 379/210 |
| 5,930,702 A | 7/1999 | Goldman et al. ............ 455/417 |
| 6,058,415 A | 5/2000 | Polcyn ....................... 709/200 |
| 6,067,357 A | 5/2000 | Kishinsky et al. ........... 379/265 |

(Continued)

FOREIGN PATENT DOCUMENTS

EP 1071295 A2 1/2001

(Continued)

OTHER PUBLICATIONS

International Search Report for related application PCT/US02/40882, mailed Oct. 8, 2003.

(Continued)

*Primary Examiner*—Philip B. Tran
(74) *Attorney, Agent, or Firm*—Withrow & Terranova, PLLC

(57) ABSTRACT

The present invention provides a presence system capable of monitoring state information, communication capabilities, or a combination thereof derived from a plurality of sources over any number of disparate networks. The state information bears on the presence or availability of the user and may take many forms. The communication capabilities relate to a potential method by which one can communicate with the user. Based on a profile provided by the user, the presence system evaluates the state information or communication capabilities from one or more sources to create presence information, including a preferred method or a prioritized list of methods by which to communicate with the user. The presence information is then delivered to subscribers of the presence information.

23 Claims, 5 Drawing Sheets

U.S. PATENT DOCUMENTS

| | | | |
|---|---|---|---|
| 6,104,913 A | 8/2000 | McAllister | 455/41 |
| 6,125,176 A | 9/2000 | Foladare et al. | 379/211 |
| 6,134,314 A | 10/2000 | Dougherty et al. | 379/207 |
| 6,141,356 A | 10/2000 | Gorman | 370/493 |
| 6,144,644 A | 11/2000 | Bajzath et al. | 370/259 |
| 6,148,328 A | 11/2000 | Cuomo et al. | 709/204 |
| 6,175,616 B1 | 1/2001 | Light et al. | 379/88.14 |
| 6,185,292 B1 | 2/2001 | Miloslavsky | 379/265 |
| 6,223,165 B1 | 4/2001 | Lauffer | 705/8 |
| 6,243,398 B1 | 6/2001 | Kahane et al. | 370/522 |
| 6,260,148 B1 | 7/2001 | Aggarwal et al. | 713/201 |
| 6,295,348 B1 | 9/2001 | Bleile et al. | 379/199 |
| 6,301,609 B1 | 10/2001 | Aravamudan et al. | 709/207 |
| 6,377,944 B1 | 4/2002 | Busey et al. | 707/3 |
| 6,389,127 B1 | 5/2002 | Vardi et al. | 379/209.01 |
| 6,418,198 B1 | 7/2002 | Brablec et al. | 379/79 |
| 6,430,289 B1 | 8/2002 | Liffick | 379/900 |
| 6,445,912 B1* | 9/2002 | Cole et al. | 455/406 |
| 6,449,344 B1 | 9/2002 | Goldfinger et al. | 379/88.17 |
| 6,463,142 B1 | 10/2002 | Kilp | 379/201.06 |
| 6,463,471 B1 | 10/2002 | Dreke et al. | 709/224 |
| 6,480,593 B1 | 11/2002 | Munday et al. | 379/211.02 |
| 6,483,900 B1 | 11/2002 | Light et al. | 379/88.17 |
| 6,546,096 B1 | 4/2003 | Meiden et al. | 379/209.01 |
| 6,564,261 B1 | 5/2003 | Gudjonsson et al. | 709/227 |
| 6,658,095 B1* | 12/2003 | Yoakum et al. | 379/93.01 |
| 6,665,395 B1 | 12/2003 | Busey et al. | 379/265.09 |
| 6,697,840 B1* | 2/2004 | Godefroid et al. | 709/205 |
| 6,700,966 B1 | 3/2004 | Takagi et al. | 379/201.06 |
| 6,735,701 B1* | 5/2004 | Jacobson | 713/201 |
| 6,738,461 B1 | 5/2004 | Trandal et al. | 379/142.02 |
| 6,807,423 B1 | 10/2004 | Armstrong et al. | 455/440 |
| 2001/0005412 A1 | 6/2001 | Light et al. | 379/88.14 |
| 2001/0044299 A1 | 11/2001 | Sandegren | 455/422 |
| 2001/0053213 A1 | 12/2001 | Truong et al. | 379/202.01 |
| 2001/0053214 A1 | 12/2001 | Kleinoder et al. | 379/207.04 |
| 2002/0024947 A1 | 2/2002 | Luzzatti et al. | 370/352 |
| 2002/0035605 A1* | 3/2002 | McDowell et al. | 709/206 |
| 2002/0038360 A1 | 3/2002 | Andrews et al. | 709/223 |
| 2002/0055975 A1 | 5/2002 | Petrovykh | 709/205 |
| 2002/0059622 A1 | 5/2002 | Grove et al. | 725/91 |
| 2002/0060988 A1 | 5/2002 | Shtivelman | 370/259 |
| 2002/0065894 A1 | 5/2002 | Dalal et al. | 709/206 |
| 2002/0076010 A1 | 6/2002 | Sahai | 379/88.19 |
| 2002/0101993 A1 | 8/2002 | Eskin | 380/270 |
| 2002/0114432 A1 | 8/2002 | Shaffer et al. | 379/90.01 |
| 2002/0116336 A1 | 8/2002 | Diacakis et al. | 705/51 |
| 2002/0116461 A1* | 8/2002 | Diacakis et al. | 709/204 |
| 2002/0120687 A1 | 8/2002 | Diacakis et al. | 709/204 |
| 2002/0126701 A1 | 9/2002 | Requena | 370/469 |
| 2002/0143876 A1 | 10/2002 | Boyer et al. | 709/205 |
| 2002/0143877 A1 | 10/2002 | Hackbarth et al. | 709/205 |
| 2002/0147777 A1 | 10/2002 | Hackbarth et al. | 709/205 |
| 2002/0147814 A1 | 10/2002 | Kimchi et al. | 709/226 |
| 2002/0181693 A1 | 12/2002 | Ribera | 379/265.09 |
| 2003/0004762 A1* | 1/2003 | Banerjee et al. | 705/5 |
| 2003/0018704 A1 | 1/2003 | Polychronidis et al. | 709/202 |
| 2003/0023681 A1 | 1/2003 | Brown et al. | 709/204 |
| 2003/0035529 A1 | 2/2003 | Baker | 379/211.02 |
| 2003/0037103 A1 | 2/2003 | Salmi et al. | 709/203 |
| 2003/0037113 A1 | 2/2003 | Petrovykh | 709/205 |
| 2003/0041101 A1* | 2/2003 | Hansche et al. | 709/203 |
| 2003/0052915 A1 | 3/2003 | Brown et al. | 345/752 |
| 2003/0055897 A1 | 3/2003 | Brown et al. | 709/205 |
| 2003/0059029 A1 | 3/2003 | Mengshoel et al. | 379/265.02 |
| 2003/0065788 A1 | 4/2003 | Salomaki | 709/227 |
| 2003/0105820 A1 | 6/2003 | Haims et al. | 709/205 |
| 2003/0129972 A1 | 7/2003 | Tosaki et al. | 455/414 |
| 2003/0135624 A1 | 7/2003 | McKinnon et al. | 709/228 |
| 2003/0154293 A1 | 8/2003 | Zmolek | 709/228 |
| 2003/0174814 A1 | 9/2003 | Diacakis | 379/80 |
| 2003/0206619 A1 | 11/2003 | Curbow et al. | 379/210.01 |
| 2003/0235287 A1 | 12/2003 | Margolis | 379/265.01 |
| 2004/0174966 A1 | 9/2004 | Koch | 379/88.22 |
| 2004/0249776 A1 | 12/2004 | Horviz et al. | 706/21 |
| 2005/0074101 A1 | 4/2005 | Moore et al. | 379/114.01 |
| 2005/0117570 A1 | 6/2005 | Cetusic et al. | 370/352 |

FOREIGN PATENT DOCUMENTS

| | | |
|---|---|---|
| EP | 1 148 688 A1 | 10/2001 |
| EP | 1 225 752 A2 | 7/2002 |
| EP | 1 329 810 A1 | 7/2003 |
| WO | 99/17194 | 4/1999 |
| WO | WO 99/34628 | 7/1999 |

OTHER PUBLICATIONS

PCT International Search Report for PCT/IB03/04250, mailed Jan. 19, 2004.

PCT International Search Report for PCT/IB03/03962, mailed Jan. 28, 2004.

Eschenburg, Axel, "Wo Laufen Sie Denn? ICQ Haelt Verbindung Zu Bekannten," CT Magazin Fuer Computer Technik, Verlag Heinz Heise GMBH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

Day, M. et al., "A Model for Presence and Instant Messaging," IETF REquest for Comments, XX, XX, No. 2778, Feb. 2000, pp. 1-17.

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for PCT/IB03/06073, mailed May 4, 2004.

Brodsky, Alexander et al., "Resource Management in Agent-based Distributed Environments," Proceedings of the 1999 International Symposium on Kyoto, Japan Nov. 28-30, 1999, pp. 95-108, XP010379697.

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Krauter, Klaus, et al., "A Taxonomy and Survey of Grid Resource Management Systems for Distributed Computing," Software Practice & Experience, John Wiley & Sons Ltd., Chichester, Great Britain, vol. 32, No. 2, Feb. 2, 2002, pp. 135-164, XP001091827.

International Search Report for PCT/IB03/05780 mailed Jan. 27, 2005.

Day, M. and Rosenberg, J., "Request for Comments (RFC) 2778: A Model for Presence and Instant Messaging," IETF-Network Working Group, Information Memo, Feb., 2000, XP002201444.

Rosenberg, J. and Schulzrinne, H., "draft-rosenberg-sip-pip.00.txt: SIP for Presence," IETF Internet Draft, Nov. 13, 1998, pp. 1-22, XP002325320.

European Search Report for 03257957.5, mailed Aug. 24, 2005.

\* cited by examiner

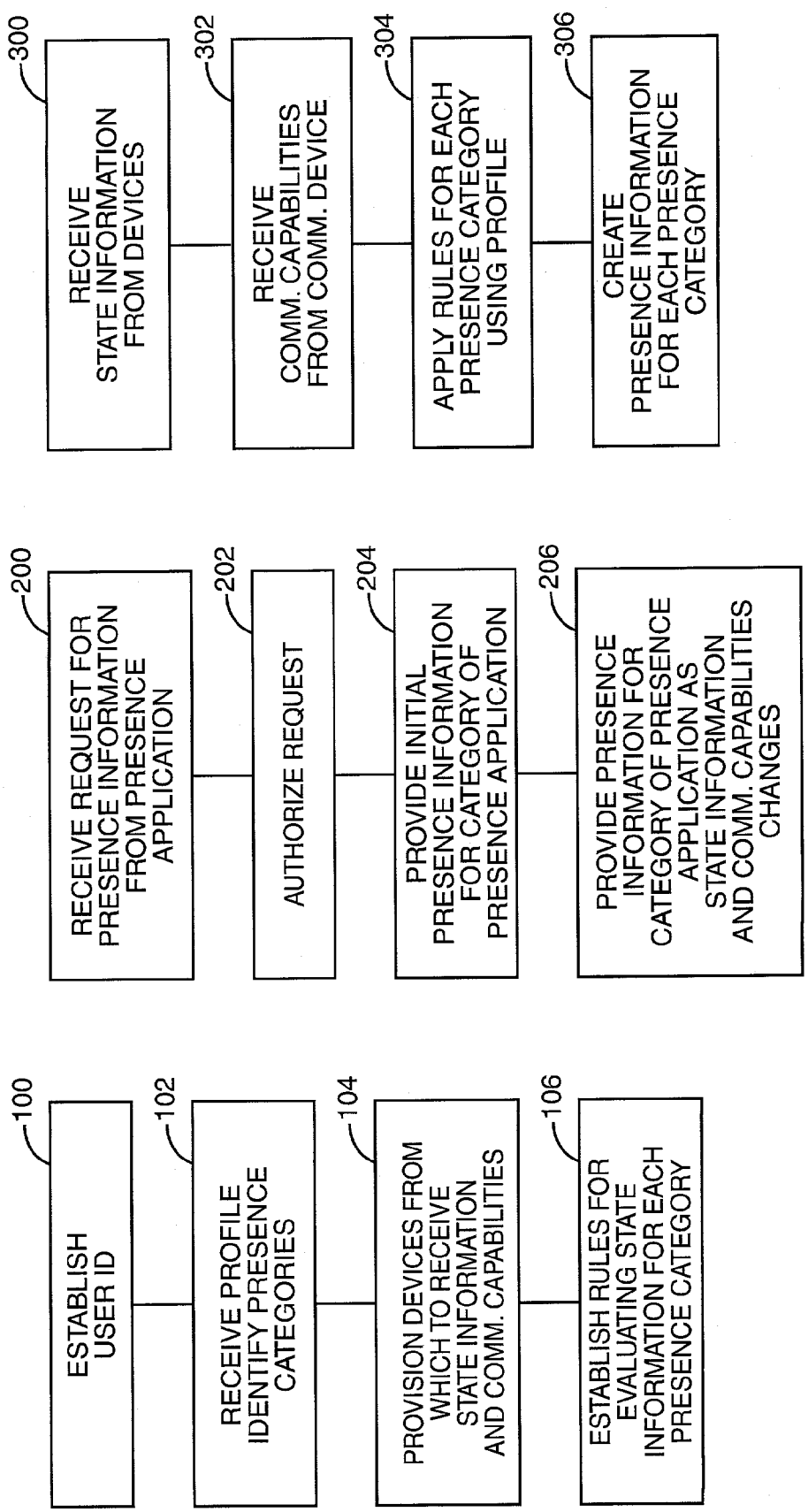

PRESENCE INFORMATION SPECIFYING COMMUNICATION PREFERENCES

FIELD OF THE INVENTION

The present invention relates to providing presence information, and in particular to providing prioritized communication methods to use when contacting a user based on the status or availability of the user.

BACKGROUND OF THE INVENTION

Presence detection is a technology used to convey information about the availability of individuals. Individuals are often interested in the availability of others and, because they are often not co-located, they require mechanisms for conveying availability or status information. The devices that people interact with know bits and pieces about how available they are for communications or other forms of interaction with others at any instant. People who are on the phone are less available to most others for the duration of the call, but may want to be interrupted by selected callers.

The location of a person on a mobile phone is information that may be relevant for determining whether that person is available for a certain type of event. For example, someone traveling far away from home may not be available for physical interaction with their neighbors, but may be available to take a call. Similarly, someone near a particular restaurant at lunchtime is a potential consumer.

Presence related information is routinely generated in many devices connected to various networks. For example, a person using a Personal Computer (PC) attached to a network may generate various presence state information. An "On-line" state indicates a user has logged onto a network, such as the Internet or a corporate intranet, while an "Off-line" state indicates no connection is currently active between the user and the presence engine. "Idle" status implies the user's system, although logged on, has not been active recently. Similarly, a person who acknowledges a calendar event in a PC or personal digital assistant (PDA) essentially signals their limited availability to most others for some duration while at the same time indicates that the person is active on that device. This level of presence indication is useful, but it is sufficiently coarse to limit its utility.

Most presence systems rely on users to select presence indications through a menu on a PC or PDA or a button on a specific device. Keeping any presence indicator accurate to the actual availability status of the user potentially requires very frequent interaction by the user to supply status information. Such tedious human interaction potentially negates the effectiveness of presence-based communications systems. Some systems sense user interaction with a single device like a PC, which lessens the direct human input while decreasing overall accuracy, since using a mouse or keyboard certainly indicates the presence of the user at the device. However, it simultaneously indicates they are engaged in an activity with the device, the importance of which is unknown. The result is a convoluted view of availability. The user is certainly present to some degree, but may be busy and may not want to be disturbed. In these kinds of systems, the user still has to provide manual input to prevent being inappropriately represented and interrupted.

The reliability and usefulness of presence information depends on the type of information provided and the device from which the information is gathered. A person actively interacting with a computer indicates to some degree that she is available, but probably only to those on the same network. A PC or other network device inside a corporate network will have visibility, independently or through a corporate presence server, to many presence inputs related to many PCs or other devices on that network. Typically, however, a device inside a corporate firewall will be isolated from having access to presence data related to devices like mobile phones, that by their very nature interconnect through commercial service provider networks.

Even when reliable and useful presence information for a user is available, the basic concept of availability for communications is inherently dependent on who is wanting to communicate with the user. Likewise, the specifics of activities that the user is engaged in at any instant bear on the desirability to be contacted by various individuals. For example, when the user is on a conference call at work they may wish to be unavailable to their coworkers but available to their family members for urgent communications. The user may wish to be accessible by select clients regardless of time, day, and location, wherein accessibility for other clients may be limited to normal working hours when the user is in the office.

Further, the basic concept of availability for communications inherently is based on the type of communication medium available to the user and the circumstances surrounding the user at the time in which communications are desired. Many circumstances dictate whether silent or verbal communications are appropriate. In the conference call example, a user may be participating in the conference call, but may want to remain available to respond to instant messages or email from all or select people. As such, the user is unavailable for telephonic communications and available for text-based messaging. Additionally, even though multiple media are available, the user will typically prefer one text-based messaging technique over another.

Accordingly, there is a need for improving both the number and quality of inputs into a presence management system in order to more efficiently and effectively deliver presence information to users of the information. Further, there is a need to provide a prioritized list of available and preferred communication media to those desiring to communicate with the user. There is also a need for a presence management system capable of providing different views of availability for different audiences at any given time.

SUMMARY OF THE INVENTION

The present invention provides a presence system capable of monitoring state information, communication capabilities, or a combination thereof derived from a plurality of sources over any number of disparate networks. The state information bears on the presence or availability of the user and may take many forms. The communication capabilities relate to a potential method by which one can communicate with the user. Based on a profile provided by the user, the presence system evaluates the state information or communication capabilities from one or more sources to create presence information, including a preferred method or a prioritized list of methods by which to communicate with the user. The presence information is then delivered to subscribers of the presence information. The profile can define different categories of subscribers for which different presence information is provided. Based on available state information, the presence system can provide different views of presence for different subscribers to allow the user to control delivery and use of presence information. Accordingly, different subscribers may receive different presence information based on the same state information and communication capabilities of the user. Preferably, the presence information bears on the availability of the user and the best methods for communicating with the user based on the user's availability and available communication capabilities.

A presence application of the subscriber may receive the presence information and take various actions to aid the subscriber in selecting the best method for communicating with the user. The presence application may be implemented in the subscriber's communication device, which is configured to initiate communications with the user based on the preferred communication method or the prioritized list of communication methods. When a prioritized list is provided, the presence application will preferably select a communication method that is available to the subscriber and has the highest priority. The communication method for communication with the user may be automatically selected by the subscriber's communication device when the subscriber wants to communicate with the user. Alternatively, an icon or like indication may be associated with the user and take a form indicative of the best method or methods for communicating with the subscriber. As such, the subscriber can simply check the status of the icon and determine the best method for communicating with the user at any given time. It is also possible for the subscriber's communication device to simply present a prioritized list of available communication methods for the subscriber to chose from.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 is a flow diagram outlining a provisioning process according to one embodiment of the present invention.

FIG. 4 is a flow diagram outlining overall operation of a presence system according to one embodiment of the present invention.

FIG. 5 is a flow diagram outlining the processing of state information according to one embodiment of the present invention.

DETAILED DESCRIPTION OF THE PREFERRED EMBODIMENTS

Figure 1:
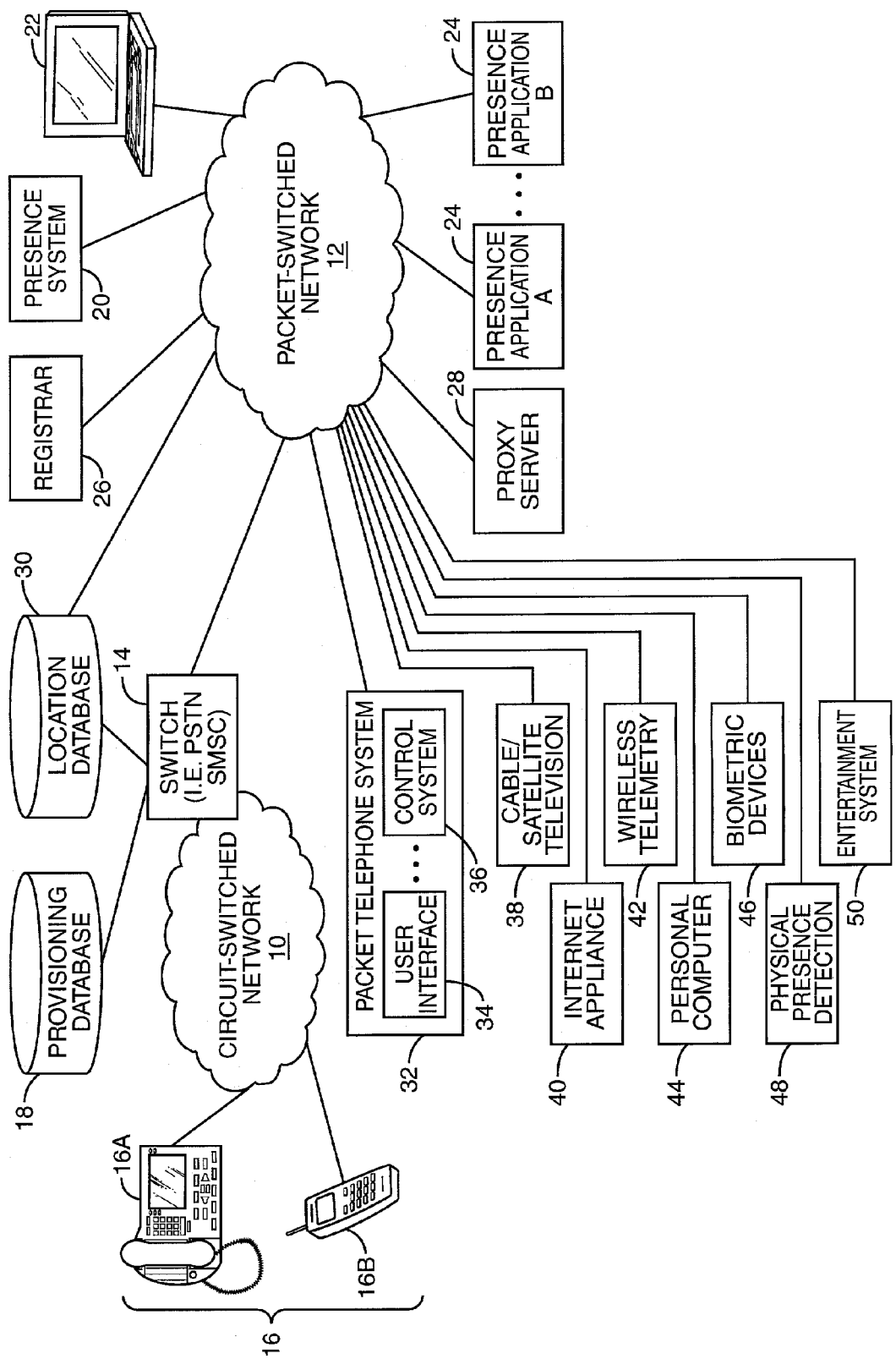
FIG. 1 is a block representation of a communication environment constructed according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a presence system capable of gathering state information and communication capabilities provided by a user and derived from a plurality of sources associated with the user over any number of disparate networks. The state information bears on the presence or availability of the user and may take many forms. The sources of state information and communication capabilities are devices used by a user throughout a normal day and configured to provide state information to the presence system. The sources may be able to monitor normal user interactions and automatically provide corresponding state information to the presence system without requiring the user to enter or otherwise provide information bearing on their status or availability. Additionally, the user may provide state information and communication capabilities to the presence system directly or indirectly via an associated device.

The sources may be devices associated with the user that support communications with the user, and are configured to provide information bearing on the device's communication capability in general or at any given time. Many communication devices, such as mobile terminals, may facilitate wireless telephony in addition to text-based messaging including instant messaging, email, and short messaging service (SMS). As such, the presence system is capable of directly or indirectly gathering the communication capabilities of the sources.

The presence system will evaluate the state information and the communication capabilities of the sources of the user to create presence information including a preferred way or a prioritized list of ways to communicate with the user. The presence information is then delivered to subscribers. In addition to the list of ways to communicate with the user, the presence information may include information ranging from a complex analysis of state information and communication capabilities from the user and associated devices to simply the states of selected devices or status provided by the user.

Based on a profile provided by the user, the presence system evaluates the state information and the communication capabilities of the sources associated with the user to create the presence information to deliver to subscribers identifying the preferred way or a prioritized list of ways to communicate with the user. The profile can define different categories of subscribers for which different presence information is provided. Based on available state information, the presence system can provide different views of presence for different subscribers to allow the user to control delivery and use of presence information. Accordingly, different subscribers may receive different presence information based on the same state information and communication capabilities. Preferably, the presence information bears on how to communicate with the user based on the user's availability and the communication capabilities for devices associated with the user. The following outlines numerous sources of information bearing on the availability of the user, the communication capabilities of devices associated with the user, and the state of devices associated with the user, along with the provisioning and operation of a presence system.

With reference to FIG. 1, a communication environment is illustrated that is capable of automatically generating presence information based on state information provided by the user and/or derived from a plurality of sources. The communication environment may include a circuit-switched network 10, such as the public switched telephone network (PSTN) or a cellular communication network, and a packet-switched network 12, such as the Internet, which supports packet-switched communications. The circuit-switched network 10 may include various types of switches 14 to facilitate circuit-switched communications for landline or wireless communications. The circuit-switched network 10 supports communications with various types of telephony devices 16, such as a traditional landline telephone 16A or a mobile telephone 16B. In a wireless communication embodiment, the switches 14 cooperate with base stations (not shown), which facilitate wireless communications with mobile terminals, such as the mobile telephone 16B. Those skilled in the art will recognize the functionality of the switches 14 and other components in the circuit-switched network 10 to facilitate circuit-switched communications with the landline and wireless telephony devices 16.

The switch 14 is defined as being either an integrated device or a multi-component system facilitating circuit-switched communication and including call server or call control functionality, which is traditionally provided in intelligent networks (IN), such as those implementing SS7 and the like. Typically, the switches 14 cooperate with a provisioning database 18, which provides information allowing a switch 14 to properly identify, locate, and provision the various telephony devices 16 in the circuit-switched network 10.

A presence system 20 capable of gathering state information provided by a user or derived from a plurality of sources, which are directly or indirectly associated with the user over any number of disparate networks, is located on the packet-switched network 12. An exemplary source for indirectly providing state information is the switch 14, which may be configured to provide the state of the user's telephony device 16, its location, or a combination thereof, directly or indirectly to the presence system 20.

In addition to state information, the presence system 20 is adapted to gather communication capabilities of a device associated with the user. The communication capabilities relate to the methods in which others may communicate with the user through the communication devices. Further, the communication capabilities may provide the general communication capabilities of a communication device or the actual availability of the communication capability at any given time. For example, if the mobile telephone 16B is capable of text-based messaging, the general communication capabilities of the mobile terminal 16B may include voice telephony and text-based messaging. When in meeting mode, the actual communication capabilities may only include text-based messaging because voice telephony is disabled.

General or actual communication capabilities of the various communication devices may be provided alone or in combination with state information. Alternatively, the presence system 20 may access devices that support the communication device, such as the switch 14 or a database used to store a collection of communication capabilities for the various communication devices. The database may be updated in any fashion and at any frequency. Alternatively, the general communication capabilities may only be registered once with the presence system 20 or database, which tracks communication capabilities. In select embodiments, the user may directly provide information bearing on available or preferred communication methods to use to contact the user.

The presence system 20 may be configured by a user device, such as a PC 22, and operates to collect state information and communication capabilities provided by users or various devices of the users, process the state information and communication capabilities to derive presence information, and provide the presence information to presence applications 24, automatically or in response to a request. Each presence application 24 is associated with a subscriber device (illustrated in FIG. 2B) and either takes action to initiate communications with the user or provides alerts to the associated subscriber based on presence information associated with a user and derived from the presence system 20. Preferably, the presence application 24 subscribes to the presence system 20 and identifies the users whose presence information is desired. The presence system 20 will accept these subscriptions as well as register participating users and their associated devices. The presence system 20 may also implement various presence delivery rules to allow users to control the dissemination of their presence information to subscribers.

Notably, various profiles may be established to allow select groups of subscribers to obtain more or different presence information than other groups. In particular, the users may define multiple categories of subscribers, which will have different presence rules. The different presence rules are used by the presence system 20 to provide different views of presence for a given user to the different subscribers, at any given time and based on given state information and communication capabilities of the user's communication devices. One or more subscribers may be associated with a category. Accordingly, each registered user may implement filters or rules to control dissemination of their presence information based on the subscriber or group of subscribers. In the converse, subscribers receiving presence information of others may also establish profiles identifying the users whose presence information is desired and the types of presence information they wish to receive.

A registrar 26 may be provided on the packet-switched network 12 to maintain a relationship between the logical and the physical addresses of devices that directly or indirectly communicate with the presence system 20. Such registration is typically required only when there is a change between the logical or user addresses and the physical addresses of a given device.

In one embodiment, the switch 14 is configured to provide state information to the presence system 20 corresponding to the status, mode, state, location, or a combination thereof associated with a telephony device 16. Further, the switch 14 may track the communication capabilities of the telephony device 16 and provide general or actual communication capabilities to the presence system 20. In this embodiment, it is preferable to provide a proxy server 28 to act as a liaison between the switch 14 and the presence system 20. As such, the switch 14 will provide state information and communication capabilities to the proxy server 28, which will represent the switch 14 to the presence system 20 in traditional proxy fashion. Those skilled in the art will recognize that the proxy server 28 is optional and may prove beneficial with certain communication protocols.

The information provided to the presence system 20 from the switch 14 will depend on the application and the type of communication environment. For example, the traditional landline telephone 16A will not change location, and will typically provide location information only as a part of registration, and dynamically provide a mechanism to determine state information relating to its operation. Further, the landline telephone's communication capabilities are fairly limited to circuit-switched, voice communications. For example, the switch 14 that serves the telephone 16A can determine whether the phone is on-hook or off-hook, and thus determine whether the user is engaged in a telephone call. More sophisticated systems may be able to determine whether the party is on a conference call, on hold, and whether any settings on the phone indicate that the user is in or out of the office. Accordingly, the state information gathered by the switch 14 in association with the operation of telephone 16A may be used to create presence information bearing on the location of the user to send to the presence system 20 via the proxy server 28. The state or like information also bears on the actual communication capability of the user at the determined location.

For mobile terminals, such as the mobile telephone 16B, the servicing mobility switching center (SMSC), which is represented by switch 14, may gather all of the state information described above, as well as provide dynamic location information derived directly from the mobile terminal 16B or from the circuit-switched network 10. Accordingly, the state information for mobile devices may be supplemented with location information, which provides the presence system 20 the opportunity to distribute presence information to the various presence applications 24 based on dynamic location, if so desired. The location information may be provided by the mobile terminal 16B, if equipped with location detection technology, such as that provided by the Global Positioning System (GPS), wherein the mobile terminal 16B receives the GPS coordinates and may provide either the coordinates to the switch 14, which will determine the mobile terminal's location, or may process the GPS information to determine a location, which is then sent to the switch 14. Alternatively, triangulation techniques may be used to determine the mobile terminal's location, which may be stored in a location database 30 or like device. The location database 30 may be accessed via the switch 14 to obtain location information, or the location database 30 may be configured such that the presence system 20 or an associated device may directly access it via the packet-switched network 12.

As noted, the communication capabilities of a mobile terminal 16B are often more numerous and diverse than those of a landline telephone 16A. Accordingly, the state information from the mobile terminals 16B is very beneficial in identifying the location of the user, or at a minimum alerting the presence system 20 that the mobile terminal 16B is in the user's possession. In combination with the state information, information bearing on the communication capabilities of the mobile terminal 16B provides a view of how to contact the user. If the mobile terminal 16B is in a meeting mode, yet also in an on state, text-based messaging may be the best alternative to send the user a message.

Packet-based telephony devices, such as the packet telephone system 32, essentially emulate the operation of circuit-switched telephony devices 16 entirely over the packet-switched network 12. Thus, a fixed or mobile packet telephone system 32 may be configured to automatically provide communication capabilities, state information, and perhaps location information, to the presence system 20 directly or indirectly via a proxy server 28. The packet telephone system 32 will include a user interface 34 and a control system 36. As those skilled in the art will recognize, the packet telephone system 32 may be integrated into a single device, or may be implemented in multiple devices in a client-server configuration. For the latter case, the proxy server 28 may be further configured to support various operational features of the packet telephone system 32.

The user interface 34 may include a microphone and speaker to facilitate voice communications, as well as various keypads and displays to allow user interaction in traditional fashion. The control system 36 will operate to support the user interface 34 and provide the requisite functionality to enable the packet telephone system 32 to facilitate communications with other devices on the packet-switched network 12 directly or indirectly via the proxy server 28. For the purposes of description, assume that the control system 36 is capable of gathering and providing communication capabilities and state information for the packet telephone system 32. In wireless environments, a wireless packet-switched network (not shown) is necessary to facilitate communications with the packet-switched network 12.

In addition to telephony-based updates, an unlimited number of devices or systems with which users directly or indirectly interact may be modified to automatically provide state information. These devices and systems may or may not support communication capabilities for the user. When communication capabilities are lacking, the devices are still beneficial in determining a location of the user and deriving the best methods to communicate with the user based on the user's relative location, which may be derived by keeping track of the devices being used by the user. The devices and systems may include cable or satellite television systems 38, internet appliances 40, wireless telemetry devices 42, PCs 44, biometric devices 46, physical presence detections systems 48, entertainment systems 50, and the like. For example, set-top boxes or receivers of cable or satellite systems 38 may be configured to provide state updates to a central location, which forwards the updates to the presence service 20 in association with the user. These devices are normally on disparate networks and configured to communicate various types of information, such as billing information, to a central location. Preferably, a server at the central location will facilitate delivery of state information to the presence system 20. The server may be configured to monitor the respective devices to determine state changes, or may simply receive state changes generated by the devices. With the proliferation of broadband Internet connectivity, particularly in cable networks, devices of this type could also be directly attached to the packet switched network 12 and provide state updates directly to the presence system 20. Similarly, internet appliances 40, such as refrigerators, dishwashers, alarm systems and the like, can readily be configured to send state information relating to user interaction directly or indirectly to the presence system 20.

Wireless telemetry devices 42 may monitor a user's interaction or location associated with a person or vehicle and provide state information to the presence system 20. Similarly, biometric devices 46, which monitor or check biometric data of the user, and physical presence detection systems 48, which monitor physical presence, may provide state information to the presence system 20. Entertainment systems 50, such as home theater systems, gaming consoles, televisions, and the like can sense user activity and provide state updates to the presence system 20. Any of the devices and systems may be connected directly or indirectly, via a gateway or the like, to the Internet.

The presence system 20 may be implemented in one or more systems. With reference to FIG. 2A, a logical breakdown of one embodiment of the presence system 20 is illustrated. The presence system 20 includes a control system 52 adapted to implement provisioning logic 54, subscriber management logic 56, rules management logic 58, and device management logic 60. The device management logic 60 facilitates and controls interaction with the various devices, which are configured to provide state information to the presence system 20 based on user interaction. The subscriber management logic 56 facilitates and controls interaction with the presence applications 24 associated with subscribers.

Accordingly, the presence applications 24 will subscribe to the presence service provided by the presence system 20 to receive status updates for one or more users via the subscriber management logic 56. Based on the subscription, the presence service will receive state information and, as available, communication capabilities from the various devices, evaluate the state information and communication capabilities to generate presence information using rules in the rules management logic 58, and deliver the presence information to the subscribing presence application 24. The device management logic 60 will control interaction with the various devices providing state information. Such control may include configuring the device to provide the state information in a specified manner and format. The provisioning logic 54 facilitates provisioning of the subscriber management logic 56, rules management logic 58, and device management logic 60. Provisioning may include establishing a profile for the user providing presence information. The profile will typically identify devices and their respective states to monitor, provide rules for evaluating the state information and communication capabilities to generate the presence information, and identify individuals, systems, or applications authorized to receive the information. Preferably, categories are defined having different rules for evaluating the state information to provide different views of presence to different subscribers on an individual or group basis. The control system 52 is also associated with a network interface 62 for facilitating communications over the packet-switched network 12.

Figure 2B:
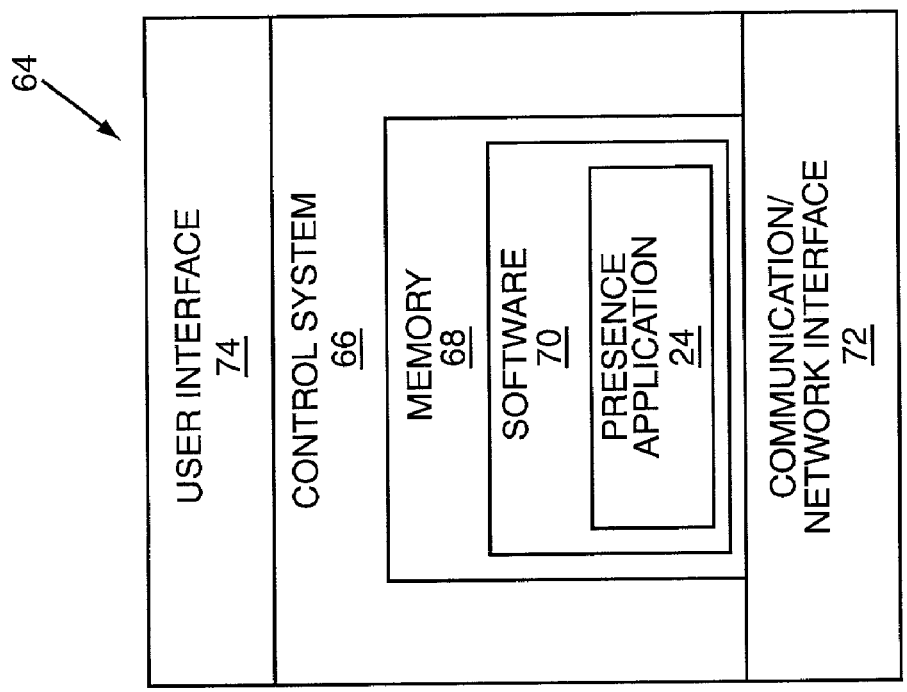
FIG. 2B is a logical representation of a subscriber device according to one embodiment of the present invention.
Figure 2A:
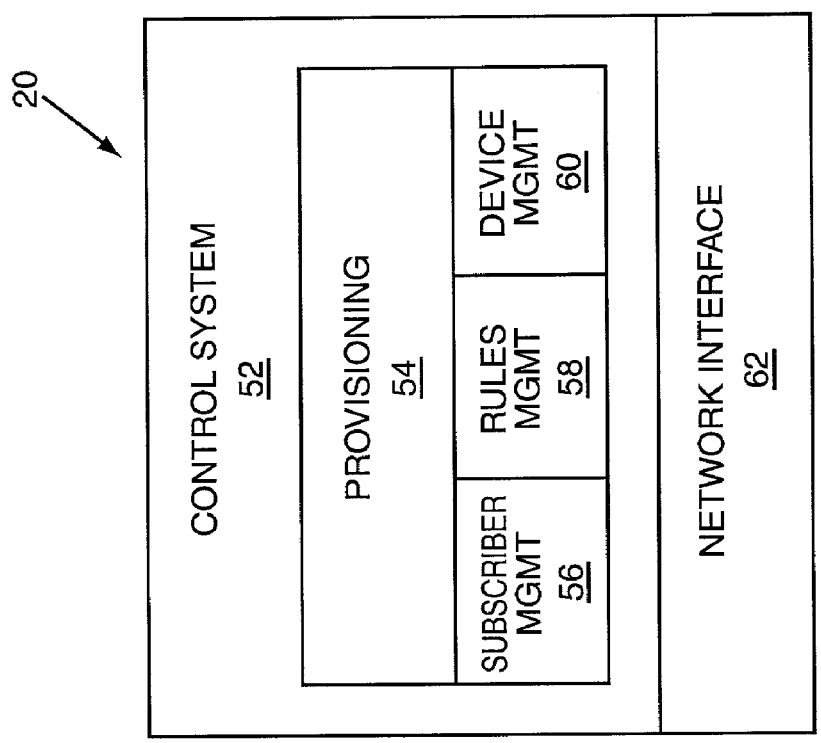
FIG. 2A is a logical representation of a presence system according to one embodiment of the present invention.

A presence application 24 is preferably implemented on a subscriber device 64 as illustrated in FIG. 2B. The subscriber device 64 will typically include a control system 66 with memory 68 for storing the necessary software 70 required for operation. In one embodiment, the presence application 24 is implemented in the software 70. The subscriber device 64 interacts with the presence system 20 via a communication network interface 72. A user interface 74 is used to support interaction with the subscriber. Preferably, the user interface 74 provides one or more subscriber input devices and a display. In response to receiving presence information from a user, the presence application 24 may be configured to provide to the subscriber the prioritized list of methods to contact the user. If the subscriber device 64 has communication capability or is associated with a communication device of the subscriber, the presence application 24 may automatically select the media used to contact the user based on the prioritized list of methods to contact the user provided in the presence information.

For example, the presence application 24 may respond to a request to contact the user by selecting an available method of communication of the subscriber device 64 having the highest priority, and initiating communication using that method. Alternatively, the presence application 24 may associate an icon with a given user and control the form of the icon in a manner indicating the best method to contact a given user. By viewing the icon, the subscriber can quickly determine the best method to use to communicate with the user. Additionally, the presence application 24 may present a prioritized list of available communication methods from which to choose. Those skilled in the art will recognize numerous ways for a subscriber to receive user presence information providing a prioritized list of methods to contact a user.

An exemplary process for initializing the presence system 20 to disseminate user information is outlined in FIG. 3. Initially, the user must establish an identification for the presence system 20 (step 100). The presence system 20 will then receive a profile for the user (step 102). Based on the profile, the presence system 20 is provisioned to receive state information and communication capabilities from the devices (sources) (step 104). Notably, the communication capabilities may be provided directly from the communication devices and gathered from a database storing the communication capabilities for all or certain communication devices. The communication capabilities may be updated on a routine basis or simply stored during initial registration.

In one embodiment, the device management logic 60 is configured to receive the state information and communication capabilities from the provisioned devices. To configure the devices, users may have to interact directly with the devices themselves, or some server or switch to which they are attached, in order to configure the devices to start sending status information and communication capabilities to a certain entity associated with the presence system 20 or directly to the presence system 20. An exemplary model may be for the devices to essentially subscribe to supply information on behalf of a user, who will authorize the devices to provide the status information. Next, the rules for evaluating the state information and communication capabilities are established for each presence category (step 106). As noted, the categories may be created for a single subscriber via the user's associated presence application 24 or for a group of subscribers. At this point, the rules management logic 58 and device management logic 60 are configured for a given user.

The rules typically define how to evaluate the state information and communication capabilities and deliver the resultant presence information for each presence category. For each presence category, a user may establish rules to control how they should be contacted based on the state of one or more associated devices and communication capabilities associated with communication devices associated with the user. For example, the following hierarchy may be implemented for a first presence category:

if the user's office PC is in use and the office telephone is on-hook, send presence information indicating the user is available in the office and directing subscribing presence applications to contact the user for voice conversations using the office telephone;

if the user's office PC is in use and the office telephone is off-hook, send presence information indicating the user is in the office but unavailable for voice conversations and directing subscribing presence applications to contact the user via instant message or office email;

if the user's mobile telephone is on and in a meeting mode, send presence information indicating the user is in a meeting and not readily available and directing subscribing presence applications to contact the user via a pager, SMS messaging, if urgent, otherwise via email or mobile instant messaging;

if the user's office PC is off and the user's mobile telephone is on and not engaged in a call, send presence information indicating the user is out of the office but available if necessary and directing subscribing applications to contact the user via the mobile telephone or mobile instant messaging;

if the user is driving a vehicle (telemetry), send presence information indicating the user is in transit and directing subscribing applications to contact the user via the mobile telephone; and if the user is interacting with an internet appliance or home entertainment system, send presence information indicating the user is at home and directing subscribing applications to contact the user via the user's home telephone.

For a second presence category, the following hierarchy may be implemented:

if the user's office PC is in use, send presence information indicating the user is available in the office and directing subscribing presence applications to contact the user for voice conversations using the office telephone; and if the user's office PC is not in use, send presence information indicating the user is out of the office but will periodically check email.

For a third presence category, the following hierarchy may be implemented:

if the user is driving a vehicle (telemetry), send presence information indicating the user is in transit and directing subscribing applications to contact the user via the mobile telephone;

if the user is interacting with an internet appliance or home entertainment system, send presence information indicating the user is at home and directing subscribing applications to contact the user via the user's home telephone; and otherwise, send presence information to contact the user at work via telephone or email.

During operation, the above rules are further controlled by the communication capabilities of the user. As such, when alternative communication choices are available, prioritized methods of communications may be provided as or with the presence information. Alternatively, the presence information may simply provide the best method to use to contact the user or a prioritized list of methods to use to contact the user. Further, the presence information may estimate the user's availability, and potentially location, rather than providing the level of granularity illustrated above, and allow the subscriber to choose how to process the information and contact the user, if desired.

Those skilled in the art will recognize limitless variations in profile and rule constructions for evaluating state information and communication capabilities for the presence categories of subscribers and generating presence information to send to subscribing presence applications. Further, any combination of current and past device state information may be used to determine the presence information. Preferably, the presence information is automatically updated for each presence category, if necessary, when changes in state or communication capabilities are detected. Depending on the presence rules, state changes or changes in communication capabilities from a given device may or may not impact the presence information. If the presence information does not change, then there may not be a need to update the subscribing presence applications 24.

FIG. 4 provides an exemplary process for subscribing to presence updates for a user through the presence system 20. Initially, a subscriber, via their presence application 24, will send a request to subscribe to the presence system 20. The subscription management logic 56 of the presence system 20 will receive the request for presence information from the presence application 24 (step 200). The presence service 20 will authorize the request (step 202), and, if authorized, provide initial presence information for the given presence category to the subscribing presence application 24 (step 204). The initial presence information may be default presence information or that based on current states and communication capabilities of the devices as evaluated by the rules. Once subscribed, the presence system 20 will provide presence information to the presence application 24 as state information or communication capabilities of the devices change in a manner warranting a presence update (step 206).

FIG. 5 illustrates an exemplary process for evaluating state information and communication capabilities from the provisioned devices. Preferably, the process continuously receives state information, and when available, communication capabilities from all provisioned devices (steps 300 and 302) and applies the rules for each presence category based on the user profile (step 304). Notably, the presence application 24 or subscriber associated therewith can also provide a profile to configure or otherwise filter the types of presence information requested. Finally, the rules management logic 58 will evaluate the state changes and communication capabilities and create presence information for each presence category, if necessary, to send to the subscribing presence applications 24 (step 306).

Accordingly, the present invention gathers state information and communication capabilities and evaluates the information using a rules-based presence system 20 that takes into account relatively static preferences supplied directly by the user wishing to project an indication of presence along with optional positional data associated with the devices. The evaluation of the state information may differ based on the presence category to allow the user to provide unique views of presence to different subscribers or groups of subscribers via the corresponding presence applications 24. The evaluation of the communication capabilities allows the user to project presence information identifying the best or most preferred methods to use to contact the user. A prioritized list of the acceptable methods to use to contact the user provides the subscriber with beneficial information while ensuring the user remains available to the extent desired or necessary. Those skilled in the art will recognize that manually provided state information may be used by the rules logic management 58 in combination with those initiated from naturally occurring interactions.

Although many communication protocols may be used to facilitate communications, including delivery of state and presence information between the various devices, the Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 2543: Session Initiation Protocol Internet Draft, which is incorporated herein by reference in its entirety.

In general, a SIP proxy, such as may be provided by the proxy server 28, may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the switch 14, the registrar 26, the presence system 20, the device running the presence application 24, and the like.

A SIP endpoint is generally capable of running an application, which is generally referred to as a user agent (UA), and is capable of facilitating media sessions using SIP. User agents register their ability to establish sessions with a SIP proxy, such as proxy server 28, by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

The following example illustrates detailed message flows related to telephony devices, which are in one particular class of devices that can provide state information. Other classes of devices, including but not limited to those previously discussed, may have their own unique message flows to achieve similar results. Those skilled in the art will recognize there are many implementation methods possible for associating devices with the presence system 20. This SIP-based example provides a relatively simple to describe explanation of relevant message flows.

Figure 6:
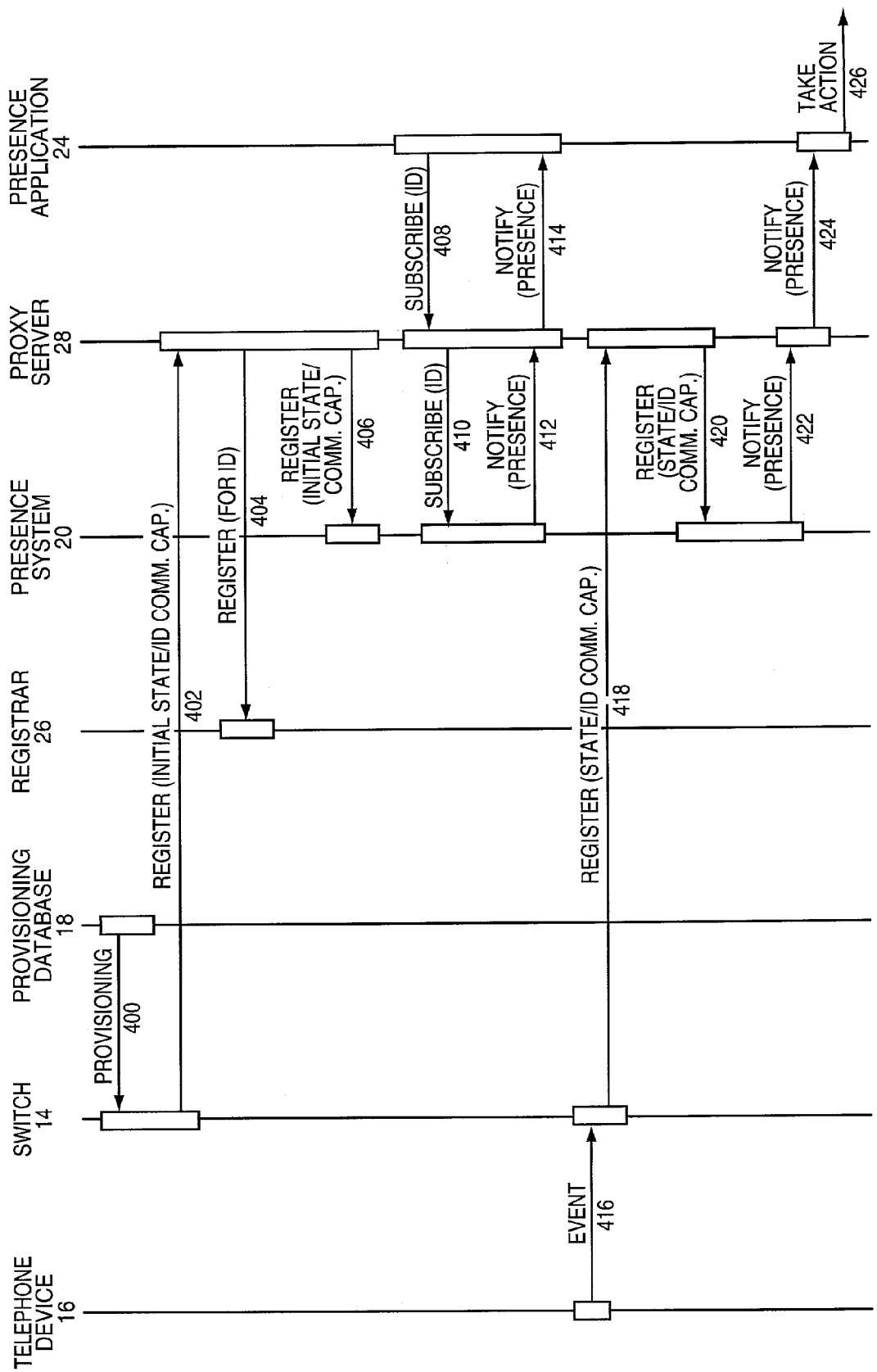
FIG. 6 is a communication flow outlining an exemplary process for automatically providing state information from a telephony system.

An exemplary message flow for providing state information relating to a telephony device 16 on the circuit-switched network 10 is illustrated in FIG. 6. Although the SIP protocol is used for illustration, those skilled in the art will recognize the general functionality of the described messages and their applicability to other protocols. Further, the switch 14 is preferably configured to monitor states resulting from user interactions or other events and provide corresponding state information, and preferably communication capabilities, to the presence system 20. For example, the user interaction could be the user selecting a mode of operation, such as ring, meeting (off or vibrate), or actually participating in a call. The communication capabilities for a mobile terminal 16B with Internet access may include normal voice telephony, SMS messaging, instant messaging, or email.

The flow begins when a user initially requests activation of the telephony device 16 through a local exchange carrier or like entity, which controls access and communications for the telephony device 16. Typically, the telephony device 16 is provisioned by providing provisioning information from the provisioning database 18 to the switch 14 (step 400). The traditional provisioning information is supplemented with information indicating whether the user of telephony device 16 wishes to subscribe to the presence service provided by the presence system 20. Accordingly, the switch 14 will receive the provisioning information from the provisioning database 18 and provision the telephony device 16, as well as store information that correlates the relationship between the telephony device 16 and a presence ID, which is used by the presence system 20 for determining the state of the telephony device 16. The telephony device 16 is typically identified on the circuit-switched network 10 using a directory number, caller identification, or similar designation. Alternatively, a user may be able to dynamically provision a device from the device, without requiring the network operator to take action.

Once the provisioning of telephony device 16 is complete, the switch 14 will send a REGISTER message to the proxy server 28 (step 402). Preferably, the switch 14 registers as a user agent, and the proxy server 28 acts as a SIP proxy server. The REGISTER message effectively registers the ability of the switch 14 to provide presence information with the SIP proxy 28. In particular, the REGISTER message informs the proxy server 28 of the SIP URL that identifies the user agent of the switch 14 to the (SIP) packet-switched network 12. The REGISTER message may also contain information about how to reach the user agent over the packet-switched network 12, typically by providing the Internet Protocol (IP) address and port that the user agent will use for SIP sessions. Preferably, the REGISTER message will also include an initial state and communication capabilities of the telephony device 16 and identification indicia for the telephony device 16. The identification indicia in a SIP environment is preferably a SIP ID, which is the logical address associated with the telephony device 16 as represented on the packet-switched network 12.

In response to this initial REGISTER message, the proxy server 28 will send a like REGISTER message to the registrar 26 to register the telephony device 16 with the registrar 26 (step 404). Further, the proxy server 28 may also forward the REGISTER message to the presence system 20 (step 406). At this point, the presence system 20 has registered the telephony device 16 and has associated an initial state and communication capabilities for the telephony device 16. All other devices used to determine presence information of the user will register in the same or similar fashion.

The presence system 20 consolidates and/or transforms device data into the state associated with a logical or user identification and provides relevant state information and communication capabilities to the presence application 24. Subsequently, the presence application 24 will subscribe to the presence service provided by the presence system 20 to receive presence information based on state changes, changes in communication capabilities, or a combination thereof associated the various devices of the user. Accordingly, the presence application 24 will send a SUBSCRIBE message, which includes identification information (SIP ID)

of the user or telephony device 16, to the proxy server 28 (step 408), which will forward the SUBSCRIBE message to the presence system 20 (step 410). In response, the presence system 20 will use the SIP ID provided in the SUBSCRIBE message to identify the user or devices for which presence information is requested. Once the presence system 20 has evaluated the state and communication capabilities of the telephony device 16, a NOTIFY message, including presence information for the user of the telephony device 16, is sent to the proxy server 28 (step 412), which forwards the NOTIFY message to the presence application 24 (step 414). At this point, the presence application 24 has subscribed to the presence service 20 for the user and has received the initial presence information for the user, and perhaps the state of the telephony device 16 and other devices, if so provisioned. Thus, the presence application 24 may react as necessary in response to receiving the presence information for the user and awaits state change notifications as well as any updates relating to communication capabilities for the user.

Assume that the telephony device 16 changes state, such as being placed on-hook, going off-hook, initiating a hold function, going out of service, initiating a service activation, changing modes, or the like. In essence, a change of state of the device may be configured to trigger an event, which is sent to the switch 14 in traditional fashion (step 416). In addition to normal processing of the event, the switch 14 will recognize that the telephony device 16 has been provisioned to alert the presence service of state changes and changes in communication capabilities, and will send a REGISTER message identifying the telephony device 16 (preferably using the SIP ID) and including the current state to the proxy server 28 (step 418), which represents the presence system 20 to the switch 14. Proxy server 28 will then send a REGISTER message to register the new state and communication capabilities in association with the identified telephony device 16 with the presence system 20 (step 420). The presence system 20 will then process the state information and communication capabilities from all associated devices to create the presence information for the user and send a NOTIFY message, if necessary, to the proxy server 28 to provide the updated presence information (step 422). The proxy server 28 will forward the NOTIFY message, which includes the presence information, to the presence application 24 (step 424), which can then take appropriate action based on the state information and communication capabilities (step 426). As noted above, the state information may be associated with location information in an appropriately configured wireless communication system.

Those skilled in the art will recognize that the use of REGISTER messages is only one implementation. In general, the switch 14 or some other device that provides autonomous state change and communication capabilities information can use a REGISTER message or some other undefined message to notify the presence service. If the presence system 20 subscribes to the information on the switch 14, which changes the role of the switch 14 to that of a presence user agent, it would allow the use of NOTIFY messages to communicate the presence data to the presence system 20.

The switch 14 may be configured to provide a table, which correlates the identification of the telephony device 16 on the circuit-switched network 10 with a presence identity, which is preferably a SIP address or URL. Using this table, the switch 14 can identify state changes for the telephony device 16, process the changes based on the rules management logic 58, and send updated state information indirectly or directly to the presence system 20. For example, assume that a user has registered for an automatic presence service from a cellular communication operator. Part of the registration process will provision a presence address and correlate it with a registered mobile telephone 16B, based either upon the mobile identification number, a SIM card identification, the telephone number, or like designation. Updating the communication capabilities for the various devices of the user can take place in the same manner alone or in combination with the state information.

Whenever the user's mobile telephone 16B is on and in reach of the mobile network, the home location register (HLR) is made aware of this fact as part of the normal course of cellular telephone operation. The HLR can register on-line status on behalf of the user's presence identification based on this information. As noted, the state information may include location identification in addition to traditional state information. Those skilled in the art will recognize the application of the present invention to both traditional time division multiplexing (TDM) switching systems and more recent innovations, such as IP public branch exchanges, or telephony clients, such as SIP user agents, H.323 endpoints, Microsoft NetMeeting, or real-time communication clients. Network resources, such as SIP proxies or H.323 gatekeepers, may also apply this technology if they retain call status information on the endpoints or user agents they manage.

Figure 7:
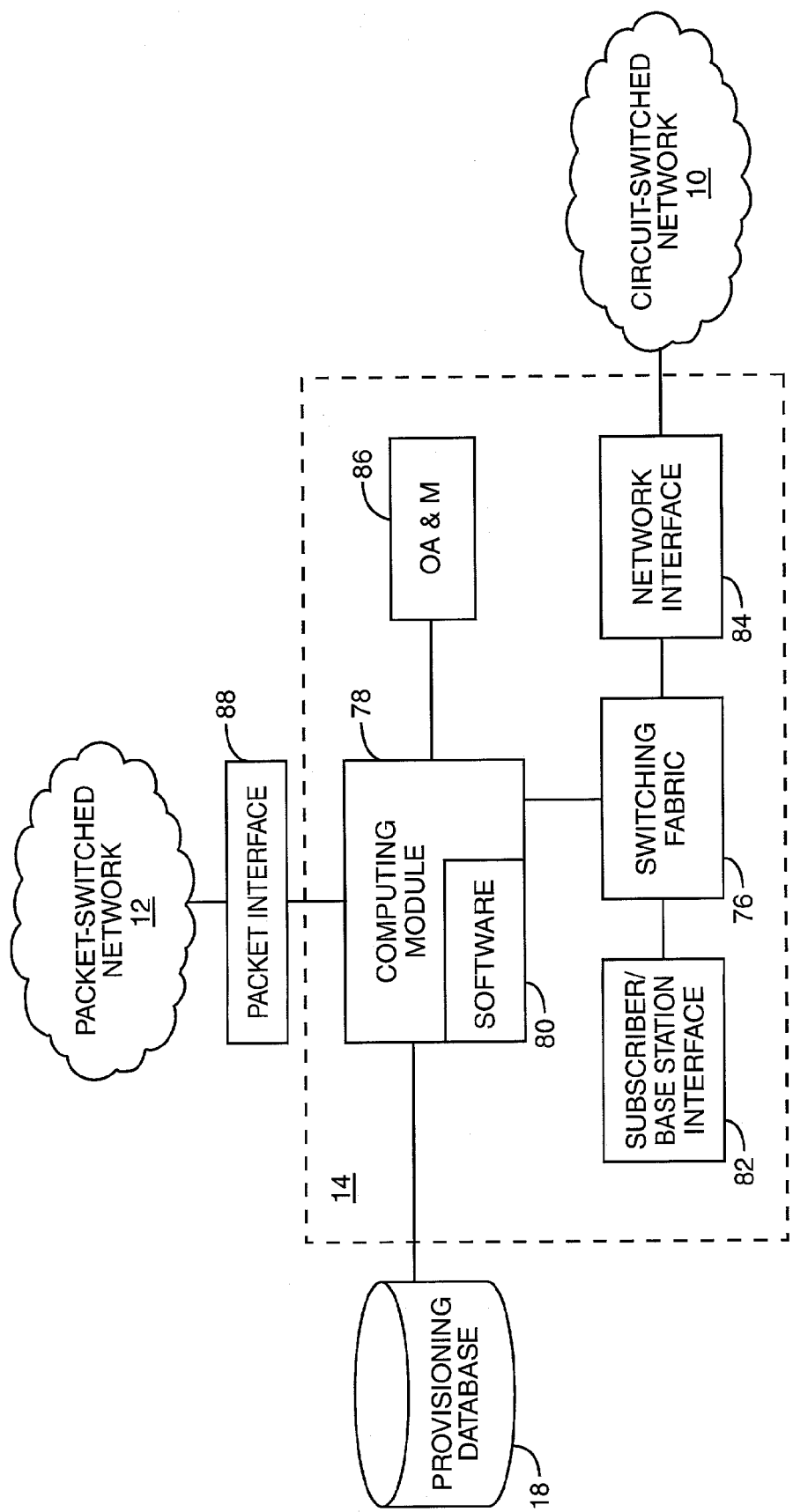
FIG. 7 is a block representation of a telephony switch constructed according to one embodiment of the present invention.

Turning now to FIG. 7, a block representation of a switch 14 is illustrated. The switch 14 is represented generically and is intended to cover the logical functionality of land-based and mobile switching systems, which include all control for call server-based functions. These switches may be implemented in a variety of ways using different equipment types, such as Nortel Networks Limited's DMS-100 local switching system. The switch 14 typically includes a switching fabric module 64, a computing module 66 including storage software 68, a subscriber/base station interface 70, a network interface 72, an operations/administration and maintenance (OA & M) module 74 and a packet interface 76. The switching fabric 64 may comprise logical and physical switches for interconnecting the subscriber/base station interface 70 with the remainder of the circuit-switched network 10 through the network interface 72. Depending on a land-based or wireless embodiment, the subscriber/base station interface 70 will either directly support subscribers through subscriber lines or will support base stations, which facilitate wireless communications with mobile devices. As illustrated, the computing module 66 controls circuit-switched communications via the switching fabric 64 and is capable of providing traditional intelligent network monitoring and functions. Further, the computing module 66 may cooperate with the provisioning database 18 as described above. As noted above, the functionality of the switch 14 may be provided in various levels of integration.

In operation, the software 68 of the computing module 66 is modified to recognize state changes associated with supported telephony devices 16 and to provide the state information via the packet interface 76 either directly or indirectly to the presence system 20 on the packet-switched network 12. As noted, the messages sent to the presence system 20 will include identification of the associated telephony device 16, relative state information and communication capabilities, and perhaps location information derived from a mobile telephone 16B or from elsewhere in the system. Preferably, the computing module 66 will cooperate with the provisioning database 18 to store information indicating that the particular telephony device 16 is subscribing to the presence service and providing an address for sending state change and change in communication capabilities messages directly or indirectly to the presence system 20. The other devices providing state information are similarly configured to trigger delivery of state information upon recognizing the occurrence of an event bearing on the availability of the user.

Current presence technology standards and systems are provided for in references from the Internet Engineering Task Force (IETF). Presence technology protocol-related publications hereby incorporated by reference include: Day, M., Aggarwal, S. and Vincent, J., "Instant Messaging/Presence Protocol Requirements," Request for Comment (RFC) 2779, February 2000; Day, M., Rosenberg, J. and Sugano, H., "A Model for Presence and Instant Messaging," RFC 2778, February 2000; Rosenberg, J. and Schulzrinne, H., "SIP caller preferences and callee capabilities," (work in progress), November 2000; Crocker, D. et al., "A Common Profile for Instant Messaging (CPIM)," (work in progress), February 2001.

Those skilled in the art will recognize improvements and modifications to the preferred embodiments of the present invention. All such improvements and modifications are considered within the scope of the concepts disclosed herein and the claims that follow.

The invention claimed is:

1. A method for providing information bearing on how a subscriber should communicate with a user comprising:
a) receiving state information bearing on availability of the user from a plurality of devices;
b) determining communication capabilities of the user;
c) evaluating the state information and the communication capabilities to create presence information identifying a preferred method for the subscriber to communicate with the user and identifying a prioritized list of methods for the subscriber to communicate with the user, the prioritized list including the preferred method for the subscriber to communicate with the user;
d) sending the presence information to a presence application associated with the subscriber;
e) evaluating the state information and the communication capabilities with a plurality of presence rules to create the presence information for each of a plurality of categories associated with a plurality of subscribers; and
f) sending the presence information to a plurality of presence applications, which are associated with the plurality of categories,
wherein different views of presence for the user are created and delivered to the presence applications based on the associated categories.

2. The method of claim 1 wherein the communication capabilities of the user are determined by accessing a database identifying methods of communicating with one or more communication devices of the user.

3. The method of claim 1 wherein the communication capabilities of the user are determined by receiving information identifying at least one method of communicating with the user from at least one communication device associated with the user.

4. The method of claim 1 wherein the communication capabilities of the user are determined by receiving information identifying at least one method of communicating with the user from the user via at least one communication device associated with the user.

5. The method of claim 1 further comprising:
a) receiving a profile from the user; and
b) generating the plurality of presence rules for each of the plurality of categories based on the profile, wherein the presence rules define how to evaluate the state information and the communication capabilities to create the presence information for each of the plurality of categories.

6. The method of claim 1 wherein the state information stems from an interaction with the plurality of devices by the user during traditional use of the device without regard to generating the state information.

7. The method of claim 1 further comprising:
a) receiving a request from the presence application to receive the presence information for the user; and
b) authorizing delivery of the presence information to the presence application.

8. The method of claim 7 further comprising:
a) determining initial presence information based on initial state information for the plurality of devices and initial communication capabilities of the user; and
b) delivering the initial presence information for the user to the presence application upon authorizing delivery of the presence information.

9. The method of claim 1 further comprising registering the plurality of devices or systems associated therewith to facilitate reception of the state information and information bearing on communication capabilities of the user.

10. The method of claim 1 wherein the state information for at least one of the plurality of devices includes location information associated with the at least one of the devices.

11. The method of claim 1 wherein the plurality of devices is associated with a plurality of disparate networks.

12. A system for providing information bearing on how a subscriber should communicate with a user comprising:
a) a packet-switched network; and
b) a control system operatively associated with the packet-switched network and adapted to:
i) receive state information bearing on availability of the user from a plurality of devices;
ii) determine communication capabilities of the user;
iii) evaluate the state information and the communication capabilities to create presence information identifying a preferred method for the subscriber to communicate with the user and identifying a prioritized list of methods for the subscriber to communicate with the user, the prioritized list including the preferred method for the subscriber to communicate with the user;
iv) send the presence information to a presence application associated with the subscriber;
v) evaluate the state information and the communication capabilities with a plurality of presence rules to create the presence information for each of a plurality of categories associated with a plurality of subscribers; and
vi) send the presence information to a plurality of presence applications, which are associated with the plurality of categories,
wherein different views of presence for the user are created and delivered to the presence applications based on the associated categories.

13. The system of claim 12 wherein the communication capabilities of the user are determined by accessing a database identifying methods of communicating with one or more communication devices of the user.

14. The system of claim 12 wherein the communication capabilities of the user are determined by receiving information identifying at least one method of communicating with the user from at least one communication device associated with the user.

15. The system of claim 12 wherein the communication capabilities of the user are determined by receiving information identifying at least one method of communicating with the user from the user via at least one communication device associated with the user.

16. The system of claim 12 wherein the control system is further adapted to:
   a) receive a profile from the user; and
   b) generate the presence rules for each of the plurality of categories based on the profile, wherein the plurality of presence rules define how to evaluate the state information and the communication capabilities to create the presence information for each of the plurality of categories.

17. The system of claim 12 wherein the state information sterns from an interaction with the plurality of devices by the user during traditional use of the device without regard to generating the state information.

18. The system of claim 12 wherein the control system is further adapted to:
   a) receive a request from the presence application to receive the presence information for the user; and
   b) authorize delivery of the presence information to the presence application.

19. The system of claim 18 wherein the control system is further adapted to:
   a) determine initial presence information based on initial state information for the plurality of devices and initial communication capabilities of the user; and
   b) deliver the initial presence information for the user to the presence application upon authorizing delivery of the presence information.

20. The system of claim 12 further comprising registering the plurality of devices or systems associated therewith to facilitate reception of the state information and information bearing on communication capabilities of the user.

21. The system of claim 12 wherein the state information for at least one of the plurality of devices includes location information associated with the at least one of the devices.

22. The system of claim 12 wherein the plurality of devices is associated with a plurality of disparate networks.

23. A computer readable medium comprising instructions for instructing a computer to:
   a) receive state information bearing on availability of the user from a plurality of devices;
   b) determine communication capabilities of the user;
   c) evaluate the state information and the communication capabilities to create presence information identifying a preferred method for a subscriber to communicate with the user and identifying a prioritized list of methods for the subscriber to communicate with the user, the prioritized list including the preferred method for the subscriber to communicate with the user;
   d) send the presence information to a presence application associated with the subscriber;
   e) evaluate the state information and the communication capabilities with a plurality of presence rules to create the presence information for each of a plurality of categories associated with a plurality of subscribers; and
   f) send the presence information to a plurality of presence applications, which are associated with the plurality of categories,
   wherein different views of presence for the user are created and delivered to the presence applications based on the associated categories.

\* \* \* \* \*